US007240095B1

(12) United States Patent
Lewis

(10) Patent No.: US 7,240,095 B1
(45) Date of Patent: Jul. 3, 2007

(54) ELECTRONIC MAIL NOTIFICATION

(75) Inventor: John E. Lewis, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 676 days.

(21) Appl. No.: 10/080,484

(22) Filed: Feb. 22, 2002

(51) Int. Cl.
*G06F 15/16* (2006.01)
*H04M 1/64* (2006.01)

(52) U.S. Cl. ................. 709/206; 455/412.2; 379/93.01

(58) Field of Classification Search ................ 370/338, 370/278; 709/206; 379/93.24, 93.01; 455/445, 455/419, 466, 412.2; 713/156, 201; 380/270; 358/402
See application file for complete search history.

(56) References Cited

U.S. PATENT DOCUMENTS

| | | | | |
|---|---|---|---|---|
| 5,995,597 A * | 11/1999 | Woltz et al. | ............. | 379/93.24 |
| 6,400,810 B1 * | 6/2002 | Skladman et al. | ........ | 379/93.24 |
| 6,421,781 B1 * | 7/2002 | Fox et al. | .................... | 713/201 |
| 6,560,456 B1 * | 5/2003 | Lohtia et al. | ............... | 455/445 |
| 6,640,301 B1 * | 10/2003 | Ng | .............................. | 713/156 |
| 6,647,260 B2 * | 11/2003 | Dusse et al. | ................ | 455/419 |
| 6,965,918 B1 * | 11/2005 | Arnold et al. | ............. | 709/206 |
| 2002/0032741 A1 * | 3/2002 | Hilt | ............................. | 709/206 |
| 2002/0035607 A1 * | 3/2002 | Checkoway et al. | ........ | 709/206 |
| 2002/0061003 A1 * | 5/2002 | Sumner et al. | ............. | 370/338 |
| 2002/0064137 A1 * | 5/2002 | Garakani et al. | ........... | 370/278 |
| 2002/0155848 A1 * | 10/2002 | Suryanarayana | ............ | 455/466 |
| 2003/0055902 A1 * | 3/2003 | Amir et al. | ................. | 709/206 |
| 2003/0072451 A1 * | 4/2003 | Pimentel et al. | ............ | 380/270 |
| 2003/0142364 A1 * | 7/2003 | Goldstone | .................... | 358/402 |
| 2003/0177171 A1 * | 9/2003 | Brown et al. | ............... | 709/203 |
| 2004/0068665 A1 * | 4/2004 | Fox et al. | .................... | 713/201 |

* cited by examiner

*Primary Examiner*—Jungwon Chang
(74) *Attorney, Agent, or Firm*—Thomas, Kayden, Horstemeyer & Risley, LLP

(57) ABSTRACT

A system and method for notifying a subscriber of new email messages located at a post office. The system includes a proxy email client in communication with a post office via an external network, the proxy email client utilizing information from a file containing the subscriber's information to access the subscriber's email account at the post office, the proxy email client retrieving a portion of an email message from the subscriber's account and sending an email notification to the subscriber for alerting the subscriber of the email message at the post office. The system further includes a wireless network in communication with the proxy email client for transmitting the email notification to the subscriber. The method includes establishing communication with a proxy email client via an external network; utilizing a subscriber's information contained in a file to access the subscriber's email account at the post office; retrieving a portion of an email message by the proxy email client; and sending an email notification to the subscriber for alerting the subscriber of the new email message at the post office.

51 Claims, 2 Drawing Sheets

ELECTRONIC MAIL NOTIFICATION

BACKGROUND

Internet electronic mail (hereinafter "email") is growing at a phenomenal rate. Users often have multiple email accounts with multiple post offices and must log into each account to obtain or check email messages residing at each email service provider. Email clients generally handle this task for users. The process of logging into multiple email servers is generally performed as a background task as long as the user's computer is connected to the Internet. However, a user is generally not notified that new email messages exist unless the user is connected to the Internet. Therefore, the user must frequently connect to the Internet in order to receive new email in a timely manner. The task of checking for new email is generally left up to the client email software.

Subscribers and users of wireless networks have an even greater challenge. Setting up the equipment to make a connection is time consuming and, therefore, users generally wait until they have email to send before checking for new email. Once connected to the Internet, the client email software checks for any new email.

Accordingly, there is a need in the art for a system and method for determining when new email is sent to a subscriber, and for sending an email notification to the subscriber alerting the subscriber of the new email. Furthermore, there is a need in the art for sending a wireless email notification to the subscriber and thus providing the subscriber with quicker and timelier access to email. There is a further need in the art to provide wireless email notification to a subscriber and sending that notification to a device that the subscriber uses to connect to the Internet or an internal network and set up that device to automatically make a connection back to the email server.

SUMMARY

According to one aspect the invention provides a system for notifying a subscriber of new email messages located at a post office. The system includes a proxy email client in communication with a post office via an external network, the proxy email client utilizing information from a file containing the subscriber's information to access the subscriber's email account at the post office, the proxy email client retrieving a portion of an email message from the subscriber's account and sending an email notification to the subscriber for alerting the subscriber of the email message at the post office.

Another aspect of the invention provides a system for notifying a subscriber of new email messages located at a post office. The system includes a proxy email client in communication with a post office via an external network, the proxy email client utilizing information from a file containing the subscriber's information to access the subscriber's email account at the post office, the proxy email client retrieving a portion of a new email message and sending an email notification to the subscriber for alerting the subscriber of the new email message at the post office; and a wireless network in communication with the proxy email client for transmitting the email notification to the subscriber.

A further aspect of the invention provides a method for notifying a subscriber of new email messages located at a post office. The method includes establishing communication with a proxy email client via an external network; utilizing a subscriber's information contained in a file to access the subscriber's email account at the post office; retrieving a portion of an email message by the proxy email client; and sending an email notification to the subscriber for alerting the subscriber of the new email message at the post office.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of a system and method in accordance with the invention.

BRIEF DESCRIPTION OF THE DRAWINGS

In the accompanying drawings, wherein like numerals represent like elements.

DESCRIPTION

Figure 1:
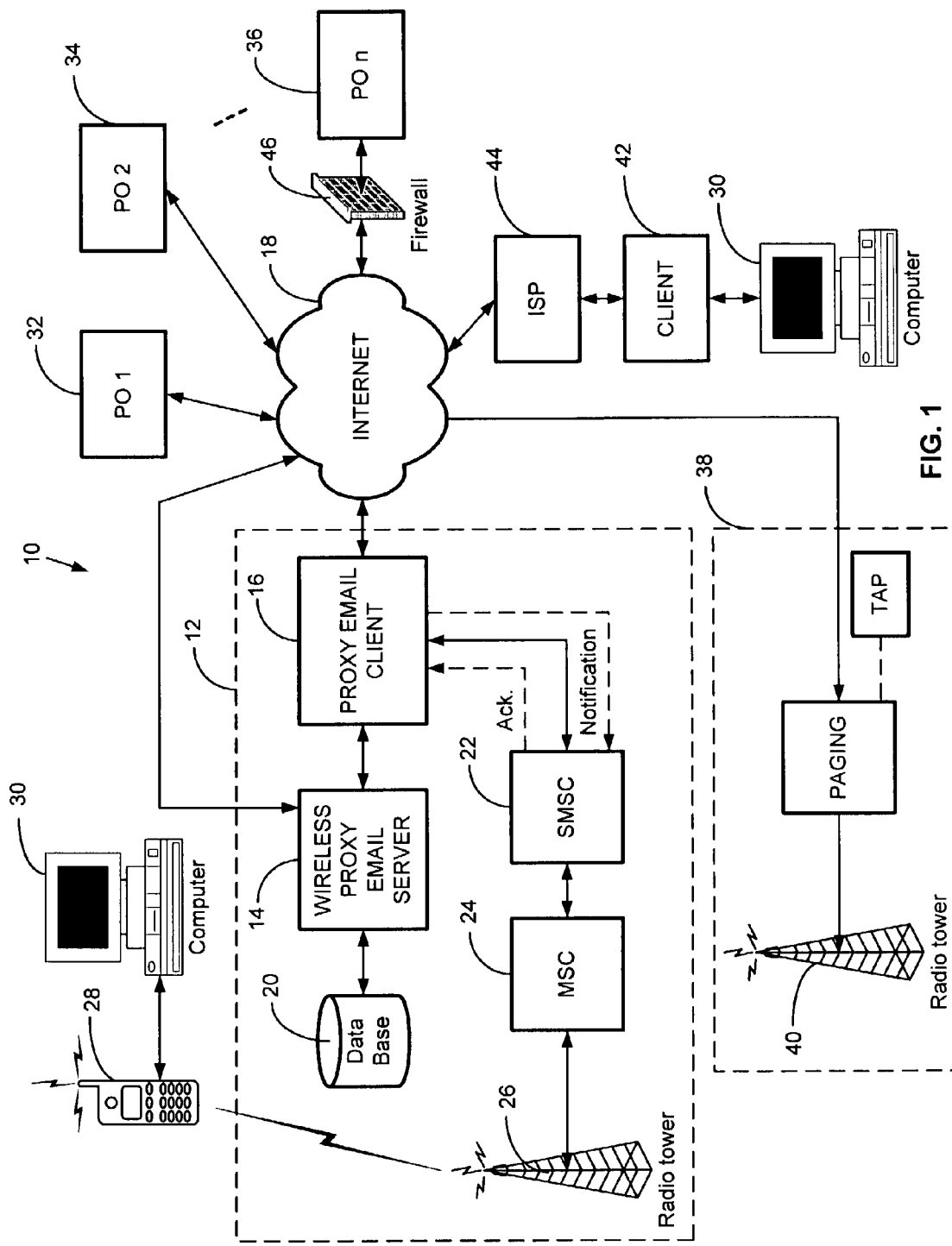
FIG. 1 is a diagram of one embodiment of a system for notifying a subscriber of new email messages located at a post office.

One embodiment of the invention provides a system and method for determining when to send a notification to alert a user that subscribes to multiple email hosts that new email has arrived. In one embodiment the invention provides a system and method for checking email messages periodically at different Internet email servers (e.g., post offices) and determining when to send notification of new email to the subscriber. The invention notifies the subscriber that new email messages are located in the subscriber's multiple email accounts without the subscriber connecting to each email service to check for new email. In one embodiment, the invention utilizes the subscriber's login information including, for example, name, password, and other information used to establish a connection with the subscriber's post offices. This login information is kept confidential in the process. In one embodiment the invention automatically determines which Internet post offices the subscriber needs to check for email messages when the subscriber manually checks for email.

In one embodiment the invention provides fast access to new email messages after the subscriber is notified of new email messages in their accounts and connects the subscriber's computer to the Internet. The invention also provides support for subscribers of wireless network services. In one embodiment of the invention, a proxy email client performs the duties that are usually performed by the client email software residing on the subscriber's computer or Local Area Network (LAN). The proxy email server can autonomously obtain a subscriber's profile from a subscriber's email session when the subscriber uses the wireless network to check for new email. The subscriber's profile generally includes the subscriber's login information such as, for example, name, password, and mail host information.

Once the proxy email client obtains the subscriber's profile and current status it stores the information in a secure file (hereinafter "user profile"). The proxy email client then periodically checks for new email on each of the email servers that the subscriber accessed during an initial manual session. For example, the proxy email client uses the information in the user profile to connect to the email servers. If the subscriber's client software adds more email servers, the proxy email client will update the user profile file when the subscriber accesses the new servers. The user profile is stored in a storage device by a proxy email server. In one embodiment the proxy email server is a wireless proxy email server.

In one embodiment, the user profile can be removed from the proxy email server each time the subscriber connects to the wireless network. The subscriber's client email software establishes a connection to each of the email servers configured in the subscriber's client email software. The proxy email client monitors these connections and updates the user profile and maintains that file on behalf of the subscriber. In one embodiment, the invention can remove a profile from the proxy email server when the proxy email client attempts to connect to one of the email servers in the subscriber's user profile file and fails to gain access. This would be an indication that the subscriber has changed their login information such as the password, or canceled the service, for example. In either case the proxy email client cannot check for new email at that email address until the subscriber logs into the proxy email server and provides the new information.

The proxy email client tracks which email messages the subscriber has read or has been notified of by noting which messages the proxy email client requests from the remote email services and setting or resetting a flag in a record file. The record file can be part of the user profile. The proxy email client also tracks which email notifications have been sent to the subscriber. In one embodiment, the proxy email client updates the user profile with an email notification record for indicating which emails the subscriber has been notified of.

Because the subscriber may have more than one access method to Internet email, synchronization between the proxy email client and the subscriber's email client may be required. Synchronization is required because the proxy email client will not know which emails the subscriber has read. Accordingly, some intelligence may be needed at the subscriber end to keep needless email notifications from propagating to the subscriber.

The proxy email server also provides an Internet email address. New email arriving to the proxy email server addressed to a subscriber of the wireless network services also can generate a notification alert via the proxy email client. The user can enable and disable such notification alerts based on, for example, the identity of the sender, subject information, or urgency of the message. These attributes can be configured for each mail service that the subscriber has stored in their user profile.

In one embodiment, the proxy email client will generally not store the body of email messages from the subscriber's email services. Only emails addressed to the proxy email server will be stored. This saves considerable file storage space that otherwise would be required for storing the full text or body of each email message. Accordingly, only pertinent email information is stored in the proxy email server or storage device associated therewith. In one embodiment, the header of the email message is stored.

In one embodiment, the proxy email client is in communication with a wireless network. In a wireless network environment the email notification can be sent to the subscriber using a Short Message Service (SMS) via a Message Center.

FIG. 1 illustrates an architectural system diagram 10 of one embodiment of a system for checking email at different Internet email servers and determining when notification of such email should be sent to the subscriber of the email services when new email arrives for the subscriber. In one embodiment, the system comprises a wireless network 12, which includes a wireless proxy email server 14 in communication with a proxy email client 16. Those skilled in the art will appreciate that the proxy email client 16 can be a software program or a separate computer without departing from the scope of the invention. Both the wireless proxy email server 14 and the proxy email client 16 are in communication with external networks such as, for example, the Internet 18. The wireless proxy email server 14 also is in communication with a database storage device 20 for storing incoming email messages addressed to the wireless proxy email server 14. In a wireless network environment, the proxy email client 16 is in communication with a Short Message Service Message Center 22 (hereinafter "SMS message center"), which in turn is in communication with a Mobile Switching Center 24 (hereinafter "MSC"). The MSC 24 is in communication with a radio tower 26 and provides communication to and from a mobile communication device 28. The mobile communication device 28 receives email notification messages from the SMS message center 22. In one embodiment, the mobile communication device 28 is in communication with a computer 30 that the subscriber uses to access email messages. In one embodiment, the mobile communication device 28 can be any digital mobile communication device that supports SMS messaging.

Furthermore, the mobile communication device 28 also can be a pager that operates in a paging network 38. The paging network 38 is in communication with the Internet 18 and transmits email notifications via a broadcast radio tower 40. The proxy email client 16 can send an email notification message via the Internet 18 to the paging network 38 for any pager that has an email address.

In one embodiment, the proxy email client 16 can send email notification alerts to any device that is in communication with the Internet 18.

The subscriber can use the wireless network 12 to access email messages at several email accounts on different email servers or post offices 32, 34, 36. The post offices 32, 34, 36 can be "HOTMAIL," ".NET," CORPORATE EMAIL," and various other email accounts, for example. Those skilled in the art will appreciate that a subscriber may subscribe to tens, hundreds, or thousands of post offices 32, 34, 36, for example. Therefore, instead of learning of new email messages by logging into the various post offices 32, 34, 36 individually, the subscriber is notified of existing new email messages via the wireless network 12. Furthermore, once notified, the subscriber can use the computer 30 as a client computer to access the Internet 18 via the wireless network 12 to retrieve the email messages.

The subscriber also can access the Internet 18 via conventional methods. For example, the subscriber can use the computer 30 to access the Internet 18 via a conventional email client 42 and an Internet Service Provider 44 (hereinafter "ISP").

The subscriber generally will have profiles of the various post offices 32, 34, 36 stored in the computer 30. The subscriber can thus use a client such as MICROSOFT OUTLOOK residing in the computer 30 to check whether the subscriber has email waiting at each of the subscriber's post office 32, 34, 36 accounts. To accomplish this task the subscriber can use the wireless network 12 or can use conventional access through the ISP 44. The subscriber accesses the wireless network 12 via the wireless proxy email server 14 using a unique login address, password, and other secure login information in order to check email messages at the various post offices 32, 34, 36. When the subscriber accesses the wireless network 12, the wireless proxy email server 14 detects which protocol the subscriber's client is using to access the email at each of the post offices 32, 34, 36. For example, the wireless proxy email server 14 can detect whether the subscriber's client is using some form of Post Office Protocol (hereinafter "POP) such as the POP3 protocol. The wireless server 14 also can detect if the subscriber's client is using a Simple Mail Transfer Protocol (hereinafter "SMTP") for delivering email to the subscriber. Once the protocol is detected, the wireless proxy email server 14 recognizes the subscriber's password and other secure login information for each email post office 32, 34, 36 the client logs into during the login session. The wireless proxy email server 14 then creates a secure user profile file containing the password and the other secure login information detected during the login session and stores the secure user profile file in the storage device 20, for example.

If the subscriber uses the conventional method for accessing email, the wireless proxy email server 14 cannot detect the protocol, and update the user profile file. Therefore, in such situations the subscriber provides the necessary user profile containing the user password and other secure login information to the wireless proxy email server 14. This enables the wireless server 14 to create and store a secure user profile file even if the subscriber does not access the subscriber's email accounts at the post offices 32, 34, 36 via the wireless network 12.

Once a user profile is created, either the subscriber provides the wireless proxy email server 14 with a periodic notification schedule or a default schedule is established, depending on the specific implementation of the invention. The wireless proxy email server 14 utilizes the information in the notification schedule to determine a periodic interval for checking the subscriber's email accounts at the post offices 32, 34, 36. The periodic notification information is then added to the user profile, for example, or can be stored in a separate file. When the user profile file is updated with the notification schedule, the proxy email client 16 will periodically login into each post office 32, 34, 36 using the appropriate secure login information in the user profile to check if the subscriber has any new email messages according to the stored notification schedule. Because there may be cost associated with a particular login interval, which is generally customized for every subscriber, the invention is not to be limited to any specific interval.

During a periodic scheduled interval, the proxy email client 16 accesses the Internet 18 and checks the subscriber's email accounts at the post offices 32, 34, 36. In one embodiment, the proxy email client 16 does not retrieve the entire contents of an email message. Rather, the proxy email client 6 retrieves only a portion of any new email messages waiting at the subscriber's post office 32, 34, 36. In one embodiment the proxy email client 16 retrieves a header portion after each new email message. The proxy email client 16 then generates a unique identifier record to determine if the email message is a new email message. In one embodiment, the proxy email client 16 computes a checksum of the retrieved portion of each new email message located at the various post offices 32, 34, 36 and uses the checksum as part of the unique identifier. In one embodiment, the checksum is computed on the header portion of the email message. The proxy email client 16 stores the computed checksum corresponding to each portion of any new email message in the user profile file for each individual subscriber in storage device 20. An email is new if the computed checksum of the relevant portion of the email message does not match any of the other checksums previously stored in the user profile. Retrieving and computing a checksum on a portion of the email message significantly reduces the required storage space. For example, an email message header may contain roughly 32 to 128 bytes of information. Therefore, storing just the checksum portion of the email message header significantly reduces the amount of storage space required at the storage device 20 and keeps the database storage requirements to a minimum.

If the proxy email client 16 determines that a particular email is new because there are no matching checksums in the corresponding user profile, it initiates a notification to the mobile communication device 28. The notification is sent via the SMS message center 22 and contains a string of characters sufficient to identify the source of the email, at which post office it can be retrieved, and the sender. The entire email message is generally not downloaded, stored, or sent to the subscriber. Only a notification of the new email message is sent. It is generally left up to the subscriber to login to the individual post offices 32, 34, 36 to retrieve the email message. The notification message can include a variety of information to inform the subscriber that there is a new email message waiting at a specific post office 32, 34, 36. The notification message can include, for example, any or all of the information contained in the email message header to notify the subscriber. The subscriber is notified only when new email messages are found at each post office 32, 34, 36 during the periodic scheduled check, and will not be repeatedly notified of the same email messages.

The SMS message center 22 provides reliable delivery of email message notifications to the subscriber via the mobile communication device 28. Accordingly, when the message is successfully delivered, the SMS message center 22 sends an acknowledgement that the notification has been sent back to the proxy email client 16. In one embodiment, when the proxy email client 16 receives a notification acknowledgment, it resets a notification flag in a notification field in a record that can be made part of the user profile file. Those skilled in the art will appreciate that an acknowledgement scheme may not work unless there is two-way communication capability between the proxy email client 16 and the mobile communication device 28. Accordingly, in the case of the paging network 38, the acknowledgement scheme may not work if the paging network supports only one-way communication. Therefore, in such cases a notification can be sent to the subscriber without receiving an acknowledgement.

Those skilled in the art will appreciate that a corporate email post office 36 that is protected by a firewall 46 may be accessible by a POP3 protocol. Accordingly, special arrangements for such accounts may be required. Corporate email accounts that use a public email post office will generally accessible by the POP3 protocol.

Figure 2:
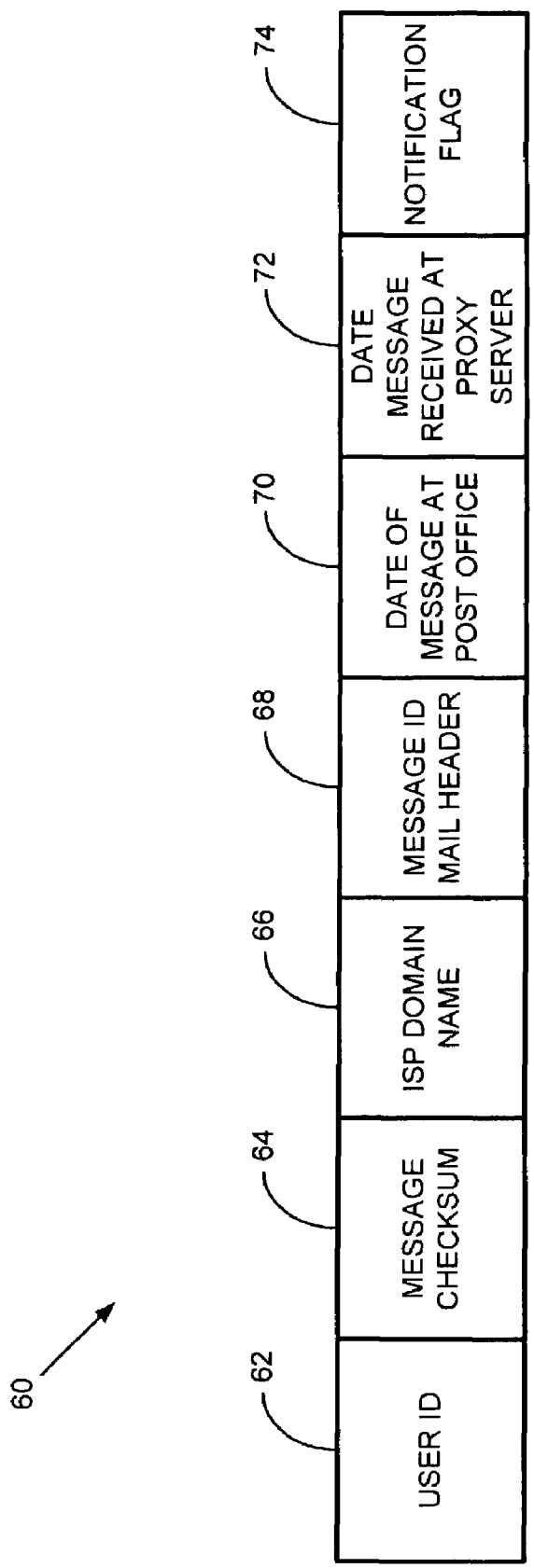
FIG. 2 is a diagram of one embodiment of a record for identifying an email message according to the invention.

FIG. 2 illustrates one embodiment of a format for storing a unique email identification record 60 for tracking each email message. Each record can be made part of the user profile and is stored in the storage device 20. As discussed previously, storing a computed checksum of a portion of an email message provides a level of uniqueness for determining whether or not an email message is new. Nevertheless, storing and relying on the checksum alone may eventually yield multiple matching checksums from different email messages. Therefore, to reduce the chances that the same checksum will occur over multiple email messages, additional information may be stored in the email identification record 60. Accordingly, the email identification record 60 can include one or more unique fields such as a User ID 62 that can be assigned by the proxy email client 16 to identify the subscriber. Furthermore, the email identification record 60 can include a field containing the actual checksum 64 computed from the email message header, or a portion of the entire email message, or the entire email message, depending on the specific implementation of the invention. The email identification record 60 also can include a field comprising the ISP domain name 66 of the individual post office 32, 34, 36. To further reduce the chance of multiple matching checksums, the email identification record 60 can include the message identification mail header 68, a post office message date 70, which is the date that the message arrived at the post office 32, 34, 36, and a proxy server message date 72, which is the date that the proxy email client 16 retrieved the email message header. Those skilled in the art will appreciate that the record 60 can include all these fields, just the checksum portion 64, or any combination of the fields 62, 64, 66, 68, 70, 72, as required to reduce the chances of multiple matching mail identification records stored in the user profile file. A notification flag field 74 can be provided as part of the email notification record 60 to determine whether or not an email notification was sent to the subscriber.

Furthermore, the date fields 70, 72 in the record 60 also may be utilized for periodical maintenance of the user profile file database. The user profile file database can be periodically purged of email identification records for messages for which the subscriber may have already been notified. To reduce the possibility that the subscriber will be notified of email messages that the subscriber may have read, the records may be purged only after a sufficiently long period such that there is high likelihood that the subscriber has read and deleted the email message. Accordingly the records 60 may be maintained in the user profile file database for up to several years before purging them.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. An apparatus for notifying a subscriber of new email messages located at a post office, comprising:
    a wireless proxy email client in communication with a wireless network and a post office via an external network, the wireless proxy email client utilizing information from a file containing the subscriber's information to periodically check for new email messages by generating a request to a wireless proxy email server to access the subscriber's email account at the post office at the external network, the wireless proxy email client retrieving a portion of an email message from the subscriber's account to uniquely identify the email message and determine if the email message is a new email message; and sending a notification to a wireless device of the subscriber for alerting the subscriber of the new email message at the post office enabling the wireless device to retrieve the new email message directly from the post office.

2. The system of claim 1, wherein the file includes information consisting of a subscriber password, subscriber login information, and post office information.

3. The system of claim 1, wherein the wireless proxy email server captures the subscriber's user profile comprising the subscriber's password, login information, and post office information when the subscriber accesses the post office via the wireless network.

4. The system of claim 3, wherein the wireless proxy email server stores the captured user profile in the file.

5. The system of claim 1, wherein the wireless network includes the wireless proxy email server in communication with the wireless proxy email client.

6. The system of claim 5, wherein the wireless proxy server is in communication with a storage device.

7. The system of claim 6, wherein the file is stored in the storage device.

8. The system of claim 6, wherein the portion of the email message retrieved from the post office is stored on the storage device.

9. The system of claim 1, wherein the wireless network includes an SMS message center.

10. The system of claim 9, wherein the wireless proxy email client sends a wireless SMS message notification to a mobile communication device to notify the subscriber of the email message via the SMS message center.

11. The system of claim 1, wherein the wireless proxy email client computes a checksum on the portion of the email message that the wireless proxy email client retrieves from the post office.

12. The system of claim 11, wherein the computed checksum is stored in the file and is used to determine whether there exists a new email message at the post office.

13. The system of claim 1, wherein the portion of the email message retrieved by the wireless proxy email client is a header portion of the email message.

14. The system of claim 1, wherein the wireless proxy email client sends a notification via the external network to a paging network for notifying the subscriber of the email message.

15. The system of claim 1, wherein the external network includes the Internet.

16. The system of claim 1, wherein the wireless proxy email client checks the post office for new email messages at a predetermined periodic rate.

17. A system for notifying a subscriber of new email messages located at a post office, comprising:
    a wireless proxy email client in communication with a wireless network and a post office via an external network, the wireless proxy email client utilizing information from a file containing the subscriber's information to periodically check for new email messages by generating a request to a wireless proxy email server to access the subscriber's email account at the post office, the wireless proxy email client retrieving a portion of a new email message to determine whether the subscriber has been notified of the new email message previously and sending a notification to a wireless device of the subscriber for alerting the subscriber of the new email message at the post office enabling the wireless device to retrieve the new email message directly from the post office if the subscriber has not been notified previously about the new email message.

18. The system of claim 17, wherein the file includes information consisting of a subscriber password, subscriber login information, and post office information.

19. The system of claim 17, wherein the wireless proxy email server captures the subscriber's user profile comprising the subscriber's password, login information, and post office information when the subscriber accesses the post office via the wireless network.

20. The system of claim 19, wherein the wireless proxy email server stores the captured user profile in the file.

21. The system of claim 19, wherein the wireless network further comprises the wireless proxy email server in communication with the wireless proxy email client.

22. The system of claim 21, wherein the wireless proxy server is in communication with a storage device.

23. The system of claim 22, wherein the file is stored in the storage device.

24. The system of claim 22, wherein the portion of the email message retrieved from the post office is stored on the storage device.

25. The system of claim 17, wherein the wireless network further comprises an SMS message center.

26. The system of claim 25, wherein the wireless proxy email client sends a wireless SMS message notification to a mobile communication device to notify the subscriber of the email message via the SMS message center.

27. The system of claim 26, wherein the wireless network further comprises an MSC in communication with the SMS message center for delivering the notification to the mobile communication device.

28. The system of claim 17, wherein the wireless proxy email client computes a checksum on the portion of the email message that the wireless proxy email client retrieves from the post office.

29. The system of claim 28, wherein the computed checksum is stored in the file and is used to determine whether there exists a new email message at the post office.

30. The system of claim 17, wherein the portion of the email message retrieved by the wireless proxy email client is a header portion of the email message.

31. The system of claim 17, wherein the wireless proxy email client sends a notification via the external network to a paging network for notifying the subscriber of the email message.

32. The system of claim 17, wherein the external network includes the Internet.

33. The system of claim 17, wherein the wireless proxy email client checks the post office for new email messages at a predetermined periodic rate.

34. A method for notifying a subscriber of new email messages located at a post office, comprising:
    establishing communication with a wireless proxy email client via an external network;
    utilizing a subscriber's information contained in a file to periodically check for new email messages by generating a request to a wireless proxy email server to access the subscriber's email account at the post office;
    retrieving a portion of an email message by the wireless proxy email client from the post office to uniquely identify the email message;
    determining whether the subscriber has been previously notified about the email message; and
    sending a notification to a wireless device of the subscriber for alerting the subscriber of the email message at the post office about which the subscriber has not been previously notified enabling the wireless device to retrieve the email message directly from the post office.

35. The method of claim 34, wherein sending the notification further comprises sending a wireless email notification.

36. The method of claim 34, further comprising computing a first checksum on the portion of the email message retrieved by the wireless proxy email client.

37. The method of claim 34, further comprising storing the first checksum in the file.

38. The method of claim 37, further comprising determining whether the post office contains a new mail message by comparing the first checksum stored in the file with a second checksum computed on an email message at the post office, wherein the second checksum is computed on the portion of the email message retrieved by the wireless proxy email client.

39. The method of claim 34, further comprising capturing a subscriber's user profile when the subscriber accesses a wireless network in communication with the wireless proxy email server to retrieve email messages at the post office.

40. The method of claim 39, wherein capturing the subscriber's user profile comprises capturing any one of a subscriber password, subscriber login information, and post office information.

41. The method of claim 39, further comprising storing the captured information in a secure file.

42. The method of claim 34, further comprising determining a periodic query rate for checking the post office for new email messages.

43. The method of claim 42, further comprising periodically checking the subscriber's post office for email messages at the predetermined rate.

44. The method of claim 34, further comprising:
    creating a unique email message identifier record; and
    storing the record.

45. The method of claim 44, wherein creating the record includes creating a record comprising a field including a checksum of a header portion of the email message retrieved by the wireless proxy email client.

46. The method of claim 45, wherein creating the record includes creating a record comprising a field including a user identification.

47. The method of claim 44, wherein creating the record includes creating a record comprising a field including an ISP domain name.

48. The method of claim 44, wherein creating the record includes creating a record comprising a field including an email message identification header.

49. The method of claim 44, wherein creating the record includes creating a record comprising a field including a user identification.

50. The method of claim 44, wherein creating the record includes creating a record comprising a field including a date on which an email message is received by the post office.

51. The method of claim 44, wherein creating the record includes creating a record comprising a field including a date on which an email message is retrieved by the wireless proxy email client.

* * * * *